(12) United States Patent
Jacobsson et al.

(10) Patent No.: US 11,984,949 B2
(45) Date of Patent: May 14, 2024

(54) BEAMFORMED TRANSMISSION USING A PRECODER

(71) Applicant: Telefonaktiebolaget LM Ericsson (publ), Stockholm (SE)

(72) Inventors: Sven Jacobsson, Västra Frölunda (SE); Sina Rezaei Aghdam, Gothenburg (SE); Thomas Eriksson, Gothenburg (SE); Hamed Farhadi, Stockholm (SE); Ulf Gustavsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 60 days.

(21) Appl. No.: 17/611,270

(22) PCT Filed: May 17, 2019

(86) PCT No.: PCT/SE2019/050455
§ 371 (c)(1),
(2) Date: Nov. 15, 2021

(87) PCT Pub. No.: WO2020/236045
PCT Pub. Date: Nov. 26, 2020

(65) Prior Publication Data
US 2022/0239350 A1    Jul. 28, 2022

(51) Int. Cl.
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC ... H04B 7/0456; H04B 7/0617; H04L 5/0023; H04L 27/368

(Continued)

(56) References Cited

U.S. PATENT DOCUMENTS 10,284,405 B2    5/2019    Laporte et al.
11,265,061 B2    3/2022    Lv et al.
(Continued)

FOREIGN PATENT DOCUMENTS

JP    2017050823 A    3/2017
JP    2019525532 A    9/2019
(Continued)

OTHER PUBLICATIONS

A. K. Papazafeiropoulos, "Impact of General Channel Aging Conditions on the Downlink Performance of Massive MIMO," in IEEE Transactions on Vehicular Technology, vol. 66, No. 2, pp. 1428-1442, Feb. 2017 (Year: 2017).*

(Continued)

*Primary Examiner* — Fitwi Y Hailegiorgis
(74) *Attorney, Agent, or Firm* — Rothwell, Figg, Ernst & Manbeck, P.C.

(57) ABSTRACT

There is provided mechanisms for beamformed transmission using a precoder. A method is performed by a radio transceiver device. The radio transceiver device comprises hardware. The hardware impacts transmission of signals from the radio transceiver device. The method comprises acquiring channel conditions of a radio propagation channel between the radio transceiver device and at least one other radio transceiver device. The method comprises determining a precoder, in form of a linear precoding matrix, for beamformed transmission towards the at least one other radio transceiver device. The precoder is determined according to the channel conditions and a model of how the hardware impacts the transmission of signals from the radio transceiver device. The method comprises transmitting, using the precoder, a signal towards the at least one other radio transceiver device.

18 Claims, 6 Drawing Sheets

(58) Field of Classification Search
USPC .......................................................... 375/267
See application file for complete search history.

(56) References Cited

U.S. PATENT DOCUMENTS

| | | |
|---|---|---|
| 2009/0180454 A1 | 7/2009 | Au et al. |
| 2011/0249637 A1 | 10/2011 | Hammarwall et al. |

FOREIGN PATENT DOCUMENTS

| | | |
|---|---|---|
| JP | 2020526150 A | 8/2020 |
| WO | 2017221054 A1 | 12/2017 |
| WO | 2020126016 A1 | 6/2020 |
| WO | 2020251436 A1 | 12/2020 |

OTHER PUBLICATIONS

Brandt et al. "Weighted Sum Rate Optimization for Multicell MIMO Systems With Hardware-Impaired Transceivers" 2014 IEEE International Conference on Acoustic, Speech and Signal Processing (ICASSP), pp. 479-483.

Bjornson et al. "Optimal Coordinated Beamforming in the Multicell Downlink with Transceiver Impairments" Globecom 2012—Wireless Communications Symposium, IEEE, pp. 4775-4780.

International Search Report and the Written Opinion of the International Searching Authority, issued in corresponding International Application No. PCT/SE2019/050455, dated Mar. 6, 2020, 11 pages.

Jacobsson et al. "Massive MU-MIMO-OFDM Uplink with Hardware Impairments: Modeling and Analysis" arXiv:1812.02078v2 [cs.IT] Jan. 8, 2019, Oct. 28, 2018, IEEE, Conference Proceedings Article, 7 pages.

Aghdam et al. "Distortion-Aware Linear Precoding for Millimeter-Wave Multiuser MISO Downlink" IEEE, 2019, 6 pages.

De Candido et al. "Reconsidering linear transmit signal processing in 1-bit quantized multi-user MISO systems," IEEE Trans. Wireless Commun., vol. 18, No. 1, pp. 254-267, Jan. 2019.

Mollén et al. "Spatial characteristics of distortion radiated from antenna arrays with transceiver nonlinearities," IEEE Trans. Wireless Commun., vol. 17, No. 10, pp. 6663-6679, Oct. 2018.

Jacobsson et al. "Linear precoding with low-resolution DACs for massive MU-MIMO-OFDM downlink," IEEE Trans. Wireless Commun., vol. 18, No. 3, pp. 1595-1609, Mar. 2019.

Jacobsson et al. "Nonlinear precoding for phase-quantized constant-envelope massive MU-MIMO-OFDM," in Proc. IEEE Int. Conf. Telecommunications (ICT), St. Malo, France, Jun. 2018, pp. 367-372.

Nedelcu et al. "Quantized precoding for multi-antenna downlink channels with MAGIQ," in Int. ITG Workshop on Smart Antennas (WSA), Bochum, Germany, Mar. 2018, 8 pages.

* cited by examiner (a) MRT; K=1, $\varphi_1$= 90°

(b) MRT; K=2, $\varphi_1$= 30°, $\varphi_2$= 90°

(c) DAB; K=1, $\varphi_1$= 90°, SNR=-10dB (d) DAB; K=2, $\varphi_1$= 30°, $\varphi_2$= 90°,SNR=-10dB (c) DAB; K=1, $\varphi_1$= 90°, SNR=30dB (f) DAB; K=2, $\varphi_1$= 30°, $\varphi_2$= 90°,SNR=30dB

US 11,984,949 B2

BEAMFORMED TRANSMISSION USING A PRECODER

CROSS REFERENCE TO RELATED APPLICATION(S)

This application is a 35 U.S.C. § 371 National Phase Entry Application from PCT/SE2019/050455, filed May 17, 2019, designating the United States, the disclosure of which is incorporated herein by reference in its entirety.

TECHNICAL FIELD

Embodiments presented herein relate to a method, a radio transceiver device, a computer program, and a computer program product for beamformed transmission using a precoder.

BACKGROUND

In communications networks, there may be a challenge to obtain good performance and capacity for a given communications protocol, its parameters and the physical environment in which the communications network is deployed.

For example, in communications networks capable of multi-user (MU) multiple-input multiple-output (MIMO) communications, in the MU MIMO downlink (i.e., in the direction from a network node at the network side towards terminal device at the user side, gains in spectral efficiency might be achieved by serving multiple terminal devices in the same time-frequency resource through spatial multiplexing. Furthermore, gains in energy efficiency might be achieved due to the antenna array gain (also denoted beamforming gain) enabled by having multiple active antenna elements at the network node. These gains are achieved by precoding (or beamforming) at the network node, which, in short, is the operation of mapping the information symbols to the transmit antenna array.

In practice, the performance of MIMO communications is limited by different hardware impairments, such as power amplifier (PA) nonlinearities, oscillator phase noise, in-phase/quadrature imbalance, and quantization noise in digital-to-analog converters (DACs) in the radio transceiver device of the network node and/or terminal device. The loss in performance due to nonideal hardware may be significant in massive MIMO communications that, due to power-consumption and cost constraints, might have to be realized using low-cost (and, hence, nonideal) hardware components. The loss in performance due to nonideal hardware is also a concern in communications networks operating over large bandwidths at millimeter-wave frequencies, where hardware costs are more significant.

Hence, there is a need for improved transmission of signals from radio transceiver devices, especially in the presence of nonideal hardware at the radio transceiver device of the network node and/or terminal device.

SUMMARY

An object of embodiments herein is to enable efficient transmission of signals from radio transceiver devices, especially in the presence of nonideal hardware at the radio transceiver device.

In some aspects, efficient transmission of signals from radio transceiver devices is enabled by precoding that takes into account the nonideal hardware.

According to a first aspect there is presented a method for beamformed transmission using a precoder. The method is performed by a radio transceiver device. The radio transceiver device comprises hardware. The hardware impacts transmission of signals from the radio transceiver device. The method comprises acquiring channel conditions of a radio propagation channel between the radio transceiver device and at least one other radio transceiver device. The method comprises determining a precoder, in form of a linear precoding matrix, for beamformed transmission towards the at least one other radio transceiver device. The precoder is determined according to the channel conditions and a model of how the hardware impacts the transmission of signals from the radio transceiver device. The method comprises transmitting, using the precoder, a signal towards the at least one other radio transceiver device.

According to a second aspect there is presented a radio transceiver device for beamformed transmission using a precoder. The radio transceiver device comprises hardware. The hardware impacts transmission of signals from the radio transceiver device. The radio transceiver device further comprises processing circuitry. The processing circuitry is configured to cause the radio transceiver device to acquire channel conditions of a radio propagation channel between the radio transceiver device and at least one other radio transceiver device. The processing circuitry is configured to cause the radio transceiver device to determine a precoder, in form of a linear precoding matrix, for beamformed transmission towards the at least one other radio transceiver device. The precoder is determined according to the channel conditions and a model of how the hardware impacts the transmission of signals from the radio transceiver device. The processing circuitry is configured to cause the radio transceiver device to transmit, using the precoder, a signal towards the at least one other radio transceiver device.

According to a third aspect there is presented a radio transceiver device for beamformed transmission using a precoder. The radio transceiver device comprises hardware. The hardware impacts transmission of signals from the radio transceiver device. The radio transceiver device further comprises an acquire module configured to acquire channel conditions of a radio propagation channel between the radio transceiver device and at least one other radio transceiver device. The radio transceiver device further comprises a determine module configured to determine a precoder, in form of a linear precoding matrix, for beamformed transmission towards the at least one other radio transceiver device. The precoder is determined according to the channel conditions and a model of how the hardware impacts the transmission of signals from the radio transceiver device. The radio transceiver device further comprises a transmit module configured to transmit, using the precoder, a signal towards the at least one other radio transceiver device.

According to a fourth aspect there is presented a computer program for beamformed transmission using a precoder, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, this provides efficient transmission of signals from the radio transceiver device. Advantageously, this provides efficient transmission of signals from the radio transceiver device in the presence of nonideal hardware at the radio transceiver device.

State-of-the-art linear precoders do not take into account a priori information about nonideal hardware at the transmitter. Advantageously, by taking hardware impairments into account, the proposed linear precoding outperforms state-of-the-art linear precoders.

Advantageously, by using the proposed determination of the linear precoder, hardware components, such as PAs, are tolerable to operate in their nonlinear region. In turn, this enables high energy efficiency compared to state-of-the-art.

Advantageously, by using the proposed determination of the precoder, a subset of the available transmit antennas can be turned off in order to reduce transmit power and circuit power consumption whenever possible.

Advantageously, even though a subset of the available transmit antennas are turned off, it is still possible to outperform, at high signal-to-noise ratio (SNR), state-of-the-art linear precoders that use all of the available transmit antennas which controls the total transmit power by backing off. Such an antenna selection procedure can further improve the energy efficiency of the communications network without sacrificing performance.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
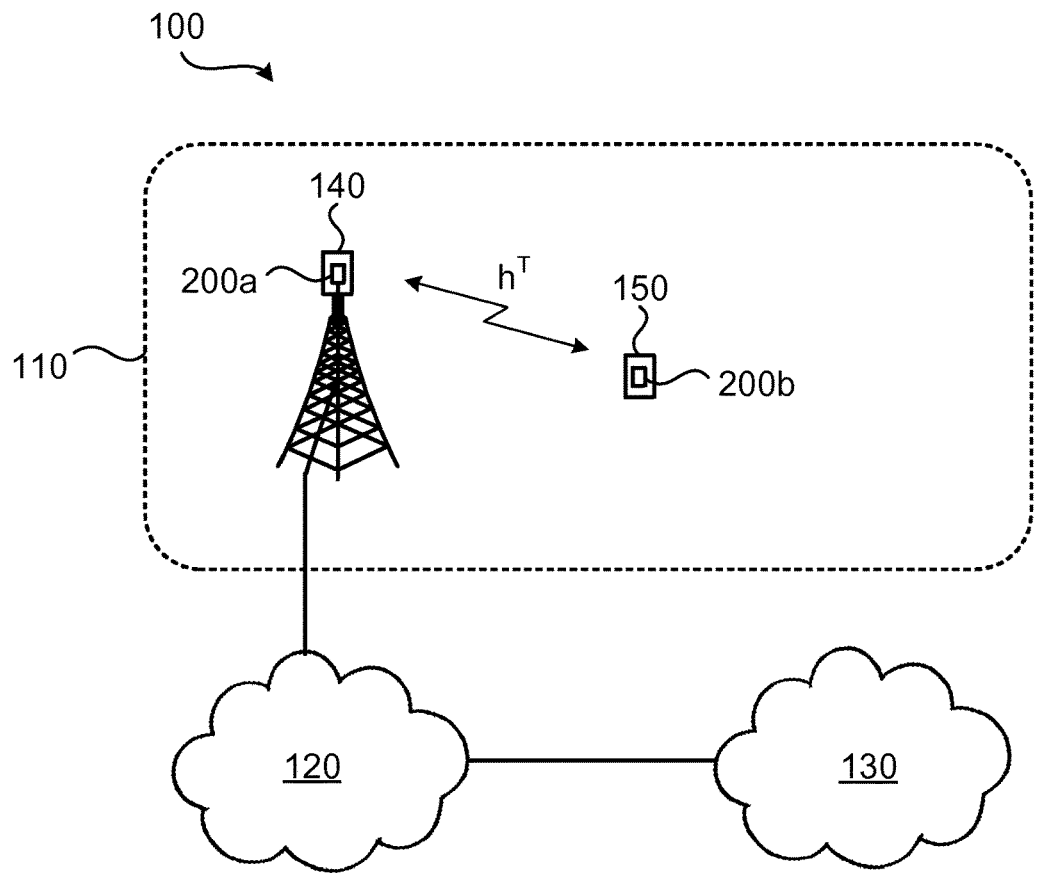
FIG. 1 is a schematic diagram illustrating a communications network according to embodiments.

FIG. 1 is a schematic diagram illustrating a communication system bow where embodiments presented herein can be applied. The communications system 100 comprises a radio access network node 140 configured to provide network access over one or more radio propagation channels (denoted $h^T$) to a terminal device 150 in a radio access network 110. Non-limited examples of terminal devices 150 are portable wireless devices, mobile stations, mobile phones, handsets, wireless local loop phones, user equipment (UE), smartphones, laptop computers, tablet computers, network equipped sensors, network equipped vehicles, and Internet of Things (IoT) devices. In some embodiments the radio access network node 140 is part of, integrated with, or collocated with a radio base station, base transceiver station, node B, evolved node B, gNB, access point, or the like. The radio access network 110 is operatively connected to a core network 120. The core network 120 is in turn operatively connected to a packet data network 130, such as the Internet. The terminal device 200 is thereby, via the radio access network node 140a, enabled to access services of, and exchange data with, the service network 130.

Each of the radio access network node 140 and the terminal device 150 comprises a respective radio transceiver device 200a, 200b. In turn, the radio transceiver device 200a, 200b comprises a precoder.

As disclosed above, there is a need for improved transmission of signals from radio transceiver devices, especially in the presence of nonideal hardware at the radio transceiver device In more detail, current state-of-the-art linear precoding algorithms, e.g., maximal-ratio transmission (MRT) and zero forcing (ZF), do not take into account the distortion caused by nonideal hardware at the transmitter side.

The embodiments disclosed herein therefore relate to mechanisms for beamformed transmission using a precoder. In order to obtain such mechanisms there is provided a radio transceiver device 200a, 200b, a method performed by the radio transceiver device 200a, 200b, a computer program product comprising code, for example in the form of a computer program, that when run on a radio transceiver device 200a, 200b, causes the radio transceiver device 200a, 200b to perform the method.

Figure 2:
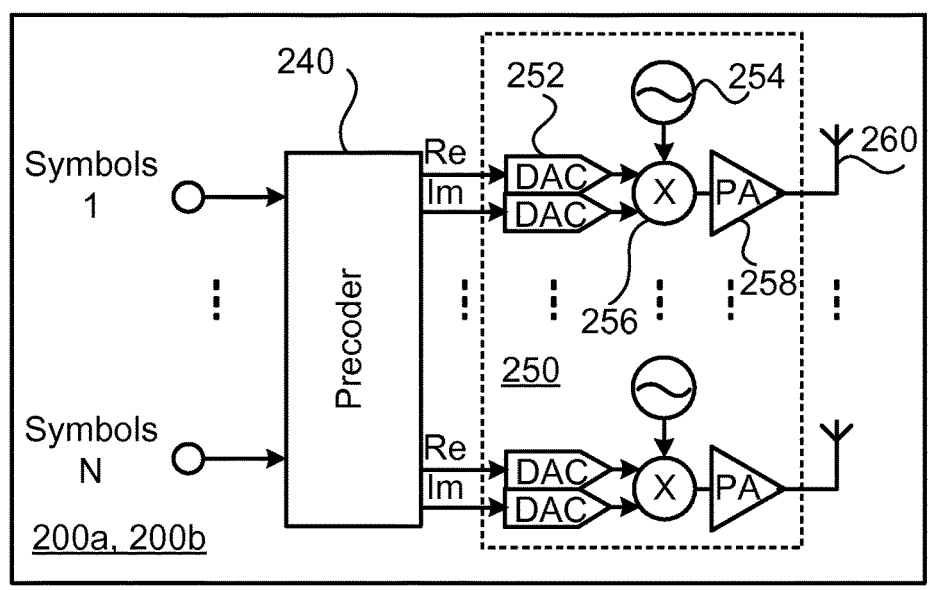
FIG. 2 schematically illustrates a precoder and hardware of a radio transceiver device according to an embodiment.

FIG. 2 in more detail illustrates the radio transceiver device 200a, 200b. The radio transceiver device 200a, 200b comprises a precoder 240. How to determine the precoder 240 will be further disclosed below. The radio transceiver device 200a, 200b further comprises hardware. The hardware under consideration for the present disclosure comprises radio circuitry 250 placed between the precoder 240 and the antenna elements 260. Examples of hardware components, that thus are part of the radio circuitry, are DACs 252, oscillators 254, and PAs 258. FIG. 2 schematically illustrates how symbols are precoded by the precoder 240 (resulting in signals having a real (Re) part and an imaginary (Im) part) and then provided, by means of the hardware (where the oscillators 254 provide a radio frequency signal that by means of mixers 256 converts the signals from the DACs up in frequency before being fed to the PAs 258), to antenna elements 260 for transmission towards one or more other radio transceiver devices 200a, 200b. The N signals being input to the precoder 240 each represents its own sequence of symbols (in FIG. 2 schematically illustrated as symbols 1, ..., symbols N). When the radio transceiver device is part of the radio access network node 140 (as radio transceiver device 200a in FIG. 1) then there could be one stream of symbols per served terminal device 150, and thus N served terminal devices 150. In this respect, the number of antenna elements 260 (where each antenna element 260 is fed by radio circuitry representing its own radio chain) need not to be equal to N.

Since the hardware impacts transmission of signals from the radio transceiver device 200a, 200b it has a negative effect on the transmission. A model representing how the hardware impacts the transmission of signals from the radio transceiver device 200a, 200b is therefore provided. In some examples the model is represented by a function φ(•). As will be disclosed below, the precoder 240 is determined taking into account the impact of the hardware, as given by the model.

Figure 3:
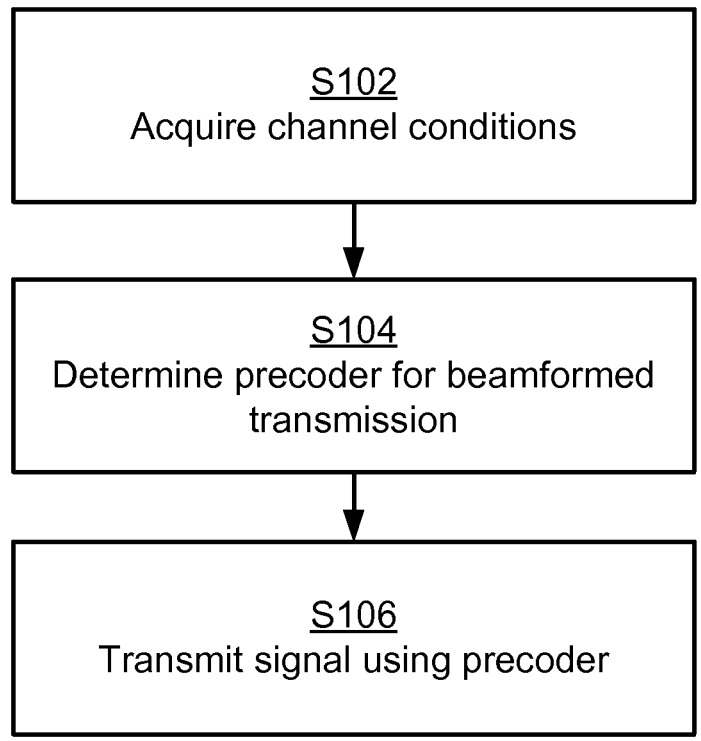
FIG. 3 is a flowchart of methods according to embodiments.

FIG. 3 is a flowchart illustrating embodiments of methods for beamformed transmission using a precoder. The methods are advantageously provided as computer programs 1020. The methods are performed by the radio transceiver device 200a, 200b. The radio transceiver device 200a, 200b comprises hardware. The hardware impacts transmission of signals from the radio transceiver device 200a, 200b.

The precoder is inter alia determined according to channel conditions. Hence, the radio transceiver device 200a, 200b is configured to perform S102:

S102: The radio transceiver device 200a, 200b acquires channel conditions of a radio propagation channel between the radio transceiver device 200a, 200b and at least one other radio transceiver device 200a, 200b.

Examples of channel conditions and how the channel conditions could be acquired will be provided below.

The precoder is further determined so as to take into account the impact of the hardware on the signal to be transmitted. Hence, the radio transceiver device 200a, 200b is configured to perform S104:

S104: The radio transceiver device 200a, 200b determines a precoder, in form of a linear precoding matrix, for beamformed transmission towards the at least one other radio transceiver device 200a, 200b. The precoder is determined according to the channel conditions and a model of how the hardware impacts the transmission of signals from the radio transceiver device 200a, 200b.

A signal is then, using the determined precoder, transmitted towards the at least one other radio transceiver device 200a, 200b. Hence, the radio transceiver device 200a, 200b is configured to perform S106:

S106: The radio transceiver device 200a, 200b transmits, using the precoder, a signal towards the at least one other radio transceiver device 200a, 200b.

The precoder thereby, in the precoding operation, takes into account the use of nonideal hardware of the radio circuitry. Specifically, a linear precoding matrix is determined based on acquired channel conditions and based on a behavioral model for the nonideal hardware used at the radio transceiver device 200a, 200b.

Embodiments relating to further details of beamformed transmission using a precoder as performed by the radio transceiver device 200a, 200b will now be disclosed.

Parallel reference will be made to the block diagram in FIG. 4 of a radio transceiver device 200a, 200b. The block diagram of FIG. 4 comprises both blocks D1, D2, D3 for feedback-based acquisition of channel conditions (for frequency-division duplexing (FDD) operation) and blocks U1, U2 for reciprocity-based acquisition of channel conditions (for time-division duplexing (TDD) operation).

Some of the below examples are illustrated for a scenario where the radio transceiver device 200a is part of the network node 140. However, the skilled person would understand how adapt these examples to a scenario where the radio transceiver device 200b is part of the terminal device 150.

There could be different examples of channel conditions. According to an embodiment, the channel conditions are defined by channel state information (CSI) and comprise information of interference in the radio propagation channel. Channel conditions (such as CSI including knowledge about the interference) is acquired at the radio transceiver device 200a, 200b as in S102. In a TDD system, channel estimates are computed based on uplink pilot symbols transmitted from the terminal devices (at blocks U1 and U2 in FIG. 4). In an FDD system, channel estimates are computed at the terminal devices, based on downlink pilots transmitted from the network node, and reported back to the network node (at blocks D1, D2, D3 in FIG. 4).

Figure 4:
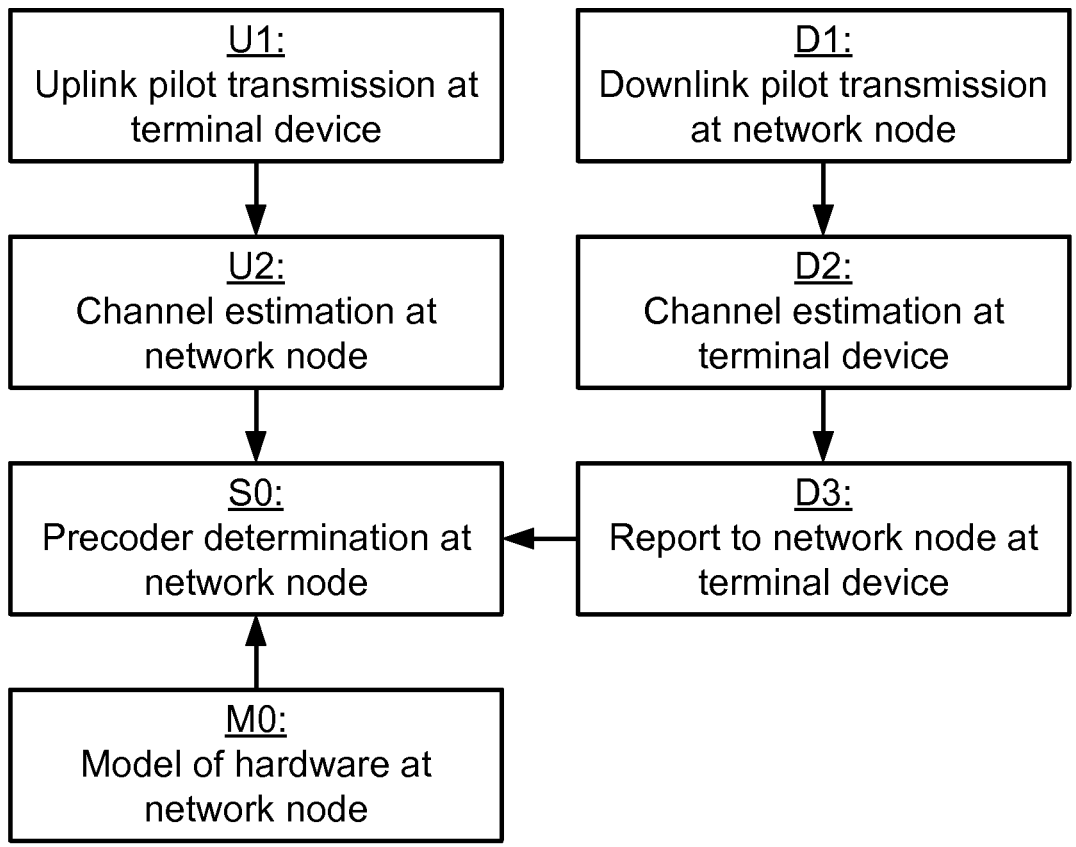
FIG. 4 is a block diagram of a radio transceiver device according to an embodiment.

Information, in terms of a model, about how the nonideal hardware used at the radio transceiver device 200a, 200b affects the transmitted signal is gathered (at block M0 in FIG. 4). In some aspects, according to the model, the hardware has a memoryless and/or a non-linear impact on the transmission of signals from the radio transceiver device 200a, 200b. In general terms, the model represents the behaviour of components of the hardware. There could be different types of components and different impact on the transmission of the signals by the components. As in FIG. 2, in some aspects the hardware comprises PAs. According to an embodiment, the model represents how input-output characteristics of the PAs impact the transmission. As is known to the skilled person, a PA has a linear operation region and a non-linear operation region. Having a model that represents how input-output characteristics of the PAs impact the transmission enables compensation for non-linearity in the PA and might thus even enable for signals to be transmitted when the PAs are operated in their non-linear region. Thus, according to an embodiment, the PAs are operated in their non-linear region when transmitting the signal towards the at least one other radio transceiver device 200a, 200b in S106. As in FIG. 2, in some aspects the hardware comprises oscillators. According to an embodiment, the model represents how phase noise of the oscillators impact the transmission. As in FIG. 2, in some aspects the hardware comprises DACs. According to an embodiment, the model represents how bit resolutions of the DACs impact the transmission. The gathered information could thus comprise input-output characteristic of the PAs, the phase noise of the oscillators, and the resolution (i.e., the number of bits) of the DACs.

Such information could be gathered from data sheets or through an estimation procedure. In particular, according to an embodiment, the model is preconfigured in the radio transceiver device 200a, 200b, and according to another embodiment, the model is obtained through estimation, for example by means over-the-air measurements as described in more detail in Section III of Annex A.

In what follows, M denotes the number of antennas at the network node and K denotes the number of (single-antenna) terminal devices.

In some aspects, the precoder is determined by solving an optimization problem. There could be different types of optimization problems. Below will be given examples where the precoder is determined by solving a non-convex optimization problem. Examples of other optimization problems that can be used to determine the precoder will be given below.

According to some aspects, the precoder is determined by solving a sum-rate optimization problem (at block S0 in FIG. 4). In what follows, P denotes the M×K precoding matrix (defining the precoder), s is the K-dimensional symbol vector, $R_{sum}(P)$ denotes the achievable sum rate (which depends on the precoding matrix P), $\phi(\cdot)$ models the hardware impairments at the network node, and $P_{tot}$ is an average transmit power constraint. These are examples of input parameters to the optimization problem. In particular, according to an embodiment, the optimization problem as input parameters has the channel conditions, the model, a transmit power constraint (such as average transmit power, instantaneous power, per antenna power), and a default precoder not impacted by the hardware. According to an embodiment, solving the optimization problem involves maximizing an achievable sum-rate for the precoder, subject to the transmit power constraint as given when applying the precoder to a signal vector representing the signal to be transmitted. The transmit power constraint is on the signal to be transmitted after it has passed through the hardware.

According to a first example the following optimization problem is solved:

$$\underset{P \in \mathbb{C}^{M \times K}}{\text{maximize}} \quad R_{sum}(P)$$

$$\text{subject to } \mathbb{E} \| \phi(Ps) \|^2 \leq P_{tot}.$$

Here, $$R_{sum}(P) = \sum_{k=1}^{K} \log_2(1 + SINDR_k(P))$$

is the achievable sum rate. Hence, in some aspects, solving the problem involves determining a signal-to-interference-noise-and-distortion ratio (SINDR). In some examples:

$$SINDR_k(P) = \frac{|h_k^T B(P) p_k|^2}{\sum_{r \neq k} |h_k^T B(P) p_r|^2 + h_k^T C_e(P) h_k^* + N_0}$$

is the SINDR at the kth terminal device (k=1,2, . . . , K). Here, $h_k$ is the M-dimensional channel vector corresponding to the kth terminal device, $p_k$ is the kth column of the precoding matrix P, and $N_0$ is the power of the thermal noise at the terminal devices (which, for simplicity, is assumed to be the same for all terminal devices). Furthermore, B(P) is an M×M gain matrix that depends on the hardware impairments and $C_e(P)$ is the M×M covariance matrix of the distortion due to hardware impairments. The optimization problem according to the first embodiment finds the precoding matrix, and thus the precoder, and the optimal transmit power that satisfies the average transmit power constraint $P_{tot}$.

According to a second example the following optimization problem is solved:

$$\underset{P \in \mathbb{C}^{M \times K}}{\text{maximize}} \quad R_{sum}(P)$$

$$\text{subject to } \mathbb{E} \| \phi(Ps) \|^2 = P_{tot}.$$

This optimization problem finds the precoding matrix, and thus the linear precoder, under an equality constraint on the average transmit power, i.e., when the average transmit power is fixed.

The optimization problems according to the above first example and second example are both nonconvex. There are many methods for approximately solving the optimization problems. For example, the precoder might be determined using a gradient projection algorithm as disclosed in Annex A to iteratively solve the optimization problem of the second example.

It is possible to use performance metrics other than sum-rate, such as max-min per-user rate or mean-squared error (MSE). That is, according to an embodiment, the precoder is determined by solving a sum-rate optimization problem, a max-min per-user rate problem, or an MSE problem.

Numerical examples demonstrating the advantage of the herein disclosed precoder compared to state-of-the-art linear precoders will be presented next. A more thorough explanation of these numerical examples is provided in Annex A.

Specifically, in what follows, the following third-order polynomial model for the nonlinearities of the hardware is used:

$$\phi(\chi) = \beta_1 \chi + \beta_3 \chi |\chi|^2.$$

Here $\beta_1$ and $\beta_3$ are the parameters of the model of the nonlinearity of the hardware, is assumed to be known to the network node. For this model, it holds that $$B(P) = \beta_1 I_M + 2\beta_3 \text{diag}(PP^H).$$

Furthermore, it holds that $$C_e(P) = 2|\beta_3|^2 (PP^H \odot P^* P^T \odot PP^H).$$

In what follows, for the numerical results, the number of antennas is set to M=16, the model parameters (the kernels of the third-order polynomial) are $\beta_1$=0.98 and $\beta_3$=−0.04−0.01j, and the transmit power constraint is set to $P_{tot}$=43 dBm.

Figure 5:
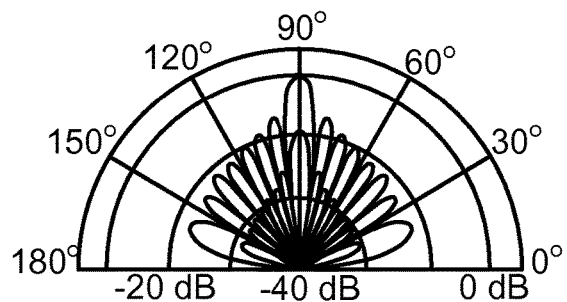
FIGS. 5, 6, and 7 show simulation results according to embodiments.
Figure 5:
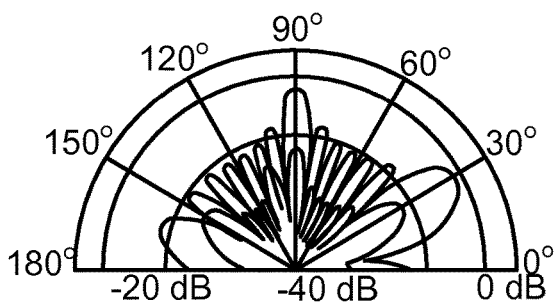
Figure 5:
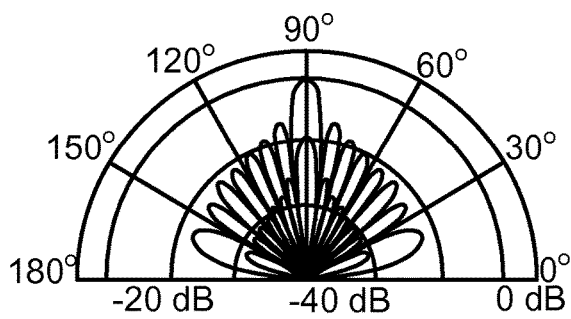
Figure 5:
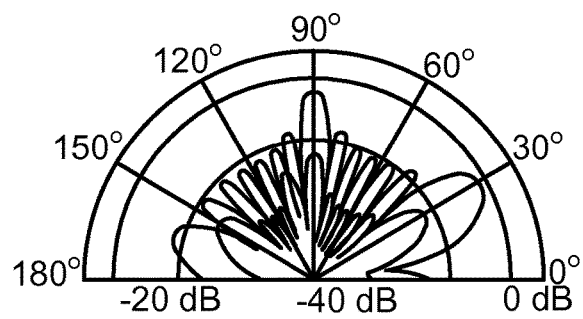
Figure 5:
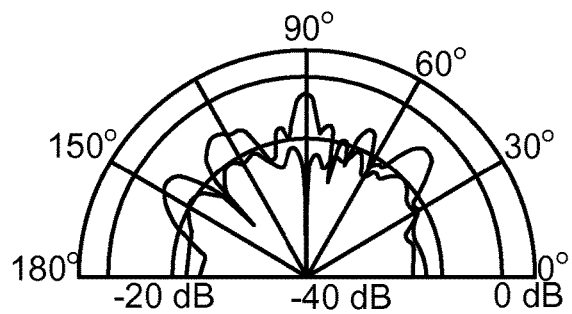
Figure 5:
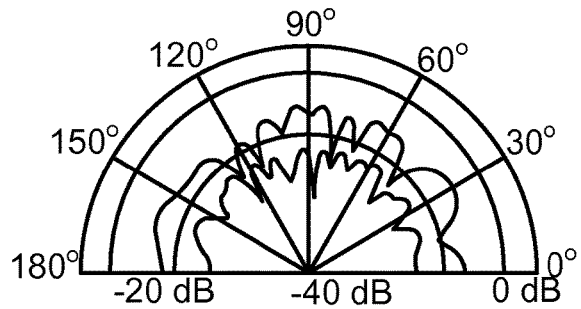

In FIG. 5 is shown the far-field radiation pattern resulting from using the disclosed precoder for the case when precoding is performed towards a single terminal device located, with respect to the network node, at an angle of departure (AoD) $\psi_1$=90° (FIG. 5(c) and FIG. 5(e)) and for the case when precoding is performed towards two terminal devices located, with respect to the network node, at AoDs $\psi_1$=30° and $\psi_1$=90° (FIG. 5(d) and FIG. 5(f)), respectively. For reference, the far-field radiation pattern for a traditional MRT precoder is also shown (FIG. 5(a) and FIG. 5(b)). It is noted from FIG. 5 that, at high SNR (i.e., when the nonlinear distortion dominates the end-user performance as in FIGS. 5(e) and (f)), the proposed precoder nulls the distortion in the direction of the terminal device(s) at the cost of reduced antenna array gain and increased radiation in unwanted directions. At low SNR (i.e., when the thermal noise dominates the end-user performance as in FIGS. 5(c) and (d)), the performance of the proposed precoder coincides with the MRT precoder.

Figure 6:
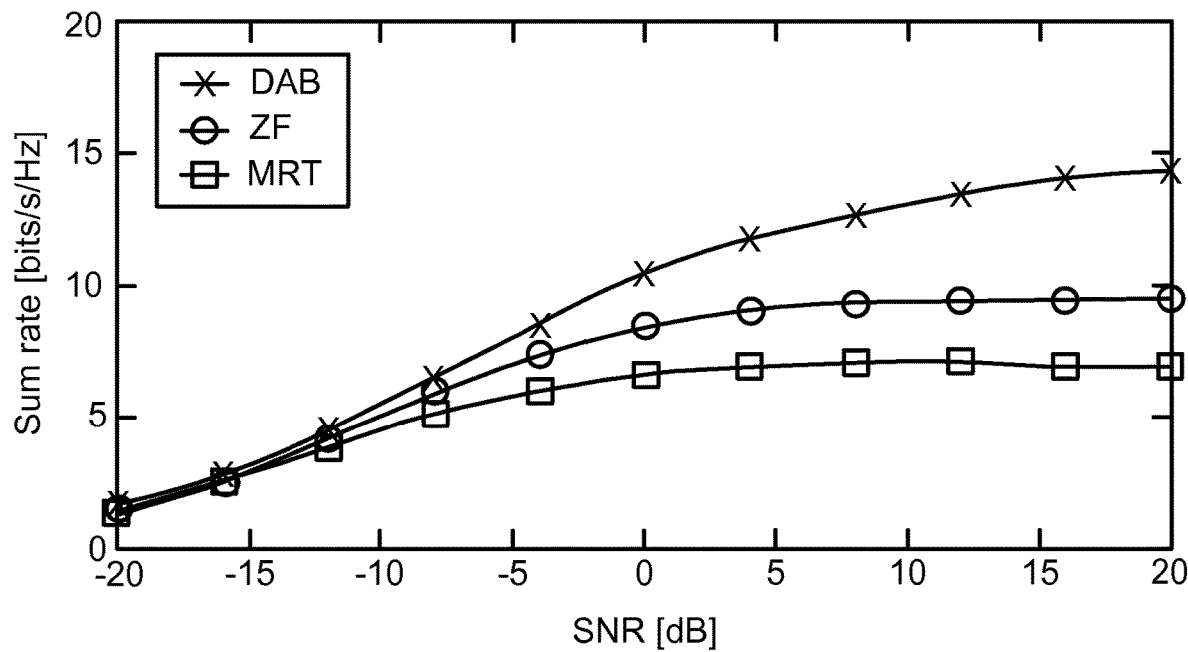

In FIG. 6 is shown the sum-rate achievable over a non-line-of-sight (nLoS) radio propagation channel for the case when the network node serves K=2 terminal devices in the same time-frequency resource. The exact simulation parameters are specified in Section IV-B of Annex A. It is noted that the proposed precoder outperforms state-of-the-art linear precoders (e.g., MRT and ZF), especially at high SNR. This demonstrates one advantage of the proposed precoder compared to state-of-the-art linear precoders.

Figure 7:
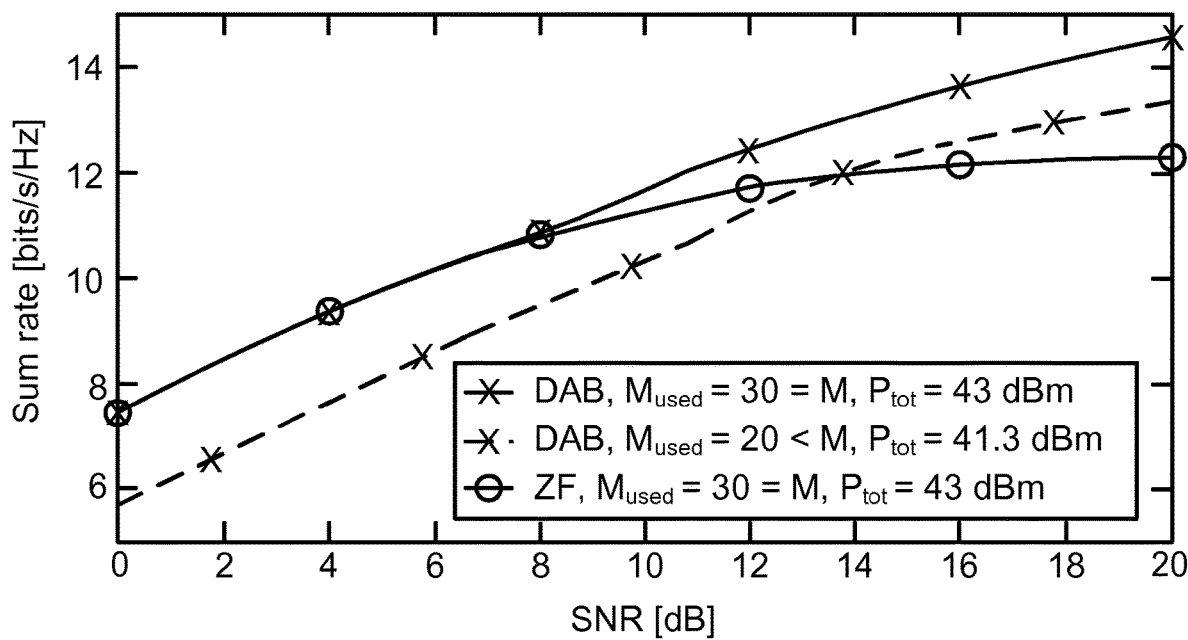

In the high-SNR regime, by using the proposed precoder in favor of state-of-the-art linear precoders, it is possible to turn off some transmit antennas and thereby backing off the total transmit power, without sacrificing performance (in terms of spectral efficiency). That is, as in the example of FIG. 2 the radio transceiver device 200a, 200b comprises transmit antenna elements from which the signal is transmitted, and according to an embodiment, less than all of the transmit antenna elements (i.e., $M_{used}$ instead of M) are utilized when transmitting the signal towards the at least one other radio transceiver device 200a, 200b. To demonstrate this, in FIG. 7 is shown the achievable sum-rate with the proposed precoder and an ZF precoder for a network node equipped with M=30 antenna elements of which only $M_{used} \leq M$ are turned on. The number of terminal devices in this example is set to K=2. It is noted from FIG. 7 that, at an SNR higher than 14 dB, by using the proposed precoder, it is possible to turn off a third of the transmit antennas (and thereby reducing the transmit power by one third) whilst still outperforming the ZF precoder where all available antennas are used. This example demonstrates that it is possible to improve the energy efficiency of MIMO systems by using the proposed precoder combined with an antenna-selection procedure.

Some of the above embodiments, aspects, scenarios, and examples have been disclosed in the context of a single-cell downlink scenario. However, if the terminal devices are equipped with multiple antenna elements, the proposed precoder could be used for the uplink as well. Moreover, the proposed precoder could be used in a multi-cell scenario as well (where a term describing interference from other cells (or network nodes) could be introduced in the denominator in the above expression for SINDR). Further, extensions to nonlinearities with memory and to frequency-selective precoding are possible but omitted for brevity of this disclosure.

Figure 8:
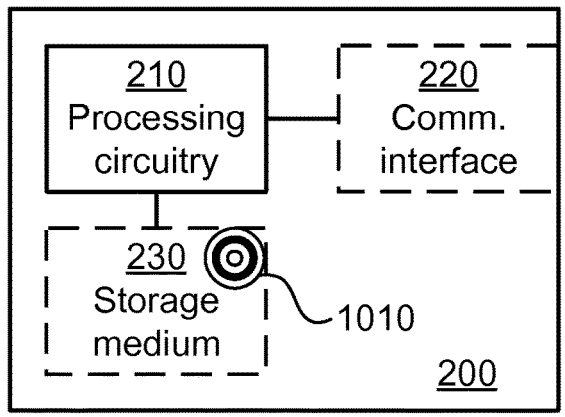
FIG. 8 is a schematic diagram showing functional units of a radio transceiver device according to an embodiment.

FIG. 8 schematically illustrates, in terms of a number of functional units, the components of a radio transceiver device 200a, 200b according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a, 200b to perform a set of operations, or steps, as disclosed above. For example, the storage medium 230 may store the set of operations, and the processing circuitry 210 may be configured to retrieve the set of operations from the storage medium 230 to cause the radio transceiver device 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a, 200b may further comprise a communications interface 220 at least configured for communications with other components, entities, functions, nodes, and devices of the communication system 100. As such the communications interface 220 may comprise one or more transmitters and receivers, comprising analogue and digital components. The processing circuitry 210 controls the general operation of the radio transceiver device 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a, 200b are omitted in order not to obscure the concepts presented herein.

Figure 9:
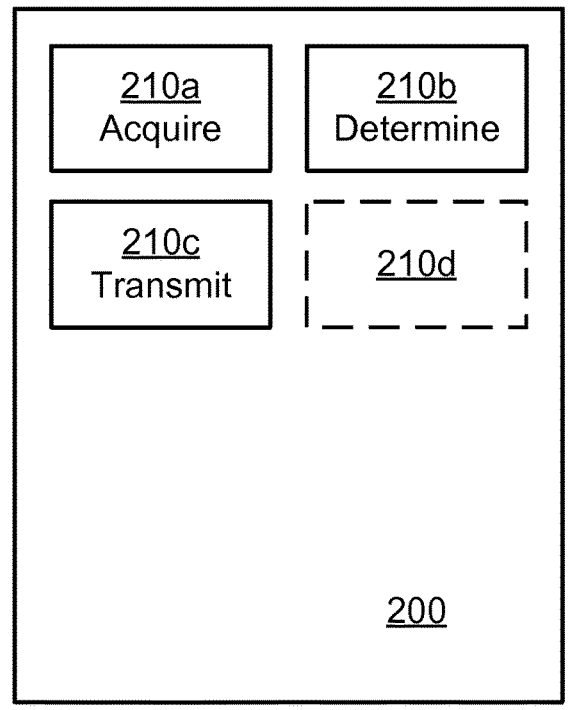
FIG. 9 is a schematic diagram showing functional modules of a radio transceiver device according to an embodiment.

FIG. 9 schematically illustrates, in terms of a number of functional modules, the components of a radio transceiver device 200a, 200b according to an embodiment. The radio transceiver device 200a, 200b of FIG. 9 comprises a number of functional modules; an acquire module 210a configured to perform step S102, a determine module 210b configured to perform step S104, and a transmit module 210c configured to perform step S106. The radio transceiver device 200a, 200b of FIG. 9 may further comprise a number of optional functional modules, as symbolized by functional module 210d. In general terms, each functional module 210a-210d may in one embodiment be implemented only in hardware and in another embodiment with the help of software, i.e., the latter embodiment having computer program instructions stored on the storage medium 230 which when run on the processing circuitry makes the radio transceiver device 200a, 200b perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The radio transceiver device 200a, 200b may be provided as a standalone device or as a part of at least one further device. For example, as disclosed with reference to FIG. 1, the radio transceiver device 200a, 200b might be part of a radio access network node 140, and/or a terminal device 150.

Figure 10:
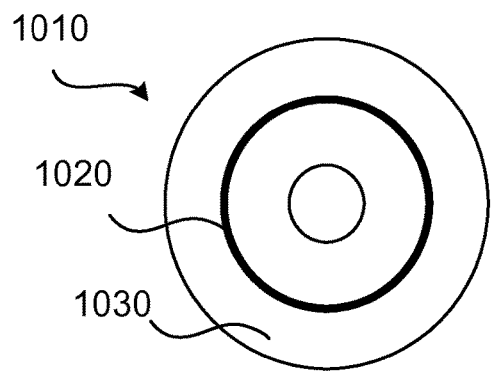
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

ANNEX A

I. Introduction

Wireless communication over millimeter-wave (mmWave) frequency bands combined with large-scale multi-antenna transmission techniques promises significant improvements in spectral efficiency compared to today's state-of-the-art communication systems [1]. These technologies are believed to be key enablers for future communication systems, including fifth generation (5G) cellular networks [2]. Recently, a large body of research has been conducted on studying the potentials of mmWave multi-antenna transmission schemes (see, e.g., [3] for a survey). However, the vast majority of these works relies on the assumption of ideal transceiver hardware, which is not a valid assumption in realistic systems.

In practice, the performance of multi-antenna systems is limited by different transceiver hardware impairments such as amplifier nonlinearities, phase noise, in-phase/quadrature (I/Q) imbalance, and quantization noise. Modeling of these impairments and evaluating the performance loss imposed by them has been a topic of much recent interest. Existing studies in this area can be categorized into two groups. The first group of works is focused on the impact of a single (or predominant) hardware impairment. For example, the impact of power amplifier (PA) nonlinearities on the performance of multi-antenna systems has been investigated in, e.g., [4]-[6]. The work in [7] characterizes the performance of mmWave multi-antenna systems (in terms of spectral and energy efficiency) in the presence of PA nonlinearities and crosstalk. The impact of other hardware impairments such as phase noise, I/Q imbalance, and quantization has been investigated in, e.g., [8]-[12]. The second group of works is concerned with evaluating the aggregate impact of several hardware impairments (see, e.g., [13]-[15]). In these works, the distortion caused by nonideal hardware is modeled as an additive Gaussian noise that is uncorrelated over the antenna array. This is, however, not a realistic assumption as the distortion caused by nonlinearities is, in general, correlated over the antenna array [16], [17]. More recently, an aggregate hardware-impairment model for the distortion caused by nonlinear amplifiers, phase noise, and quantization, which captures the inherent correlation within the distortion, was provided in [18].

In this disclosure, we propose an iterative scheme, which we refer to as distortion-aware beamforming (DAB), for finding a linear precoder that takes into account the use of nonlinear PAs at the transmitter. Specifically, we consider a downlink mmWave multiuser multiple-input single-output (MISO) system and formulate a non-convex optimization problem to find the linear precoder that maximizes a lower bound on the sum rate, which we solve approximately using gradient ascent. We demonstrate the efficacy of the proposed DAB precoder by means of numerical simulation. Specifically, we show that, by taking nonlinear distortion into account, the DAB precoder outperforms conventional maximal-ratio transmission (MRT) and zero-forcing (ZF) precoding.

Lowercase and uppercase boldface letters denote vectors and matrices, respectively. The superscripts $(\cdot)^*$, $(\cdot)^T$, and $(\cdot)^H$ denote complex conjugate, transpose, and Hermitian transpose, respectively. We use $\mathbb{E}[\cdot]$ to denote expectation. We use $\|a\|$ to denote the $\ell_2$-norm of a. The $M\times M$ identity matrix is denoted by $I_M$ and the $M\times M$ all-zeros matrix is denoted by $0_{M\times M}$. We use $A\odot B$ to denote the Hadamard (entry-wise) product of two equally-sized matrices A and B. Moreover, diag(A) is the main diagonal of a square matrix A. The distribution of a circularly-symmetric complex Gaussian random vector with covariance matrix $C\in\mathbb{C}^{M\times M}$ is denoted by $\mathcal{CN}(0_{M\times M}, C)$. Finally, we use $\mathbb{1}_\mathcal{A}(a)$ to denote the indicator function, which is defined as $\mathbb{1}_\mathcal{A}(a)=1$ for $a\in\mathcal{A}$ and $\mathbb{1}_\mathcal{A}(a)=0$ for $a\notin\mathcal{A}$.

II. System Model and Problem Formulation

We consider the nonlinearly distorted multiuser MISO system depicted in FIG. 1. Here, an M-antenna transmitter serves K single-antenna users in the same time-frequency resource. The received signal at the kth user is given by $$y_k = h_k^T \phi(x) + w_k, \quad (1)$$

for k=1, . . . , K. Here, $h_k\in\mathbb{C}^M$ is the channel between the transmitter and the kth user (which we assume is constant for the duration of each codeword), $x=[\chi_1, \ldots, \chi_M]^T\in\mathbb{C}^M$ is the precoded vector, and $w_k\sim\mathcal{CN}(0, N_0)$ is the additive white Gaussian noise (AWGN). We use the nonlinear function $\phi(\cdot): \mathbb{C}\to\mathbb{C}$ which is applied entry-wise on a vector, to model the nonlinear PAs at the transmitter.

We consider linear precoding such that x=Ps, where $P=[p_1, \ldots, p_K]\in\mathbb{C}^{M\times K}$ is the precoding matrix and $s=[s_1, \ldots, s_K]^T\sim\mathcal{CN}(0_{K\times K}, I_K)$ are the transmitted symbols.

A. Modeling of Transmitter Hardware Impairments

In order to analyze the impact of the nonlinear distortion on the performance of the system, we shall, similarly to, e.g., [8], [17], [18], use Bussgang's theorem [19], which allows us to write the nonlinearly distorted signal $\phi(x)$ as $$\phi(x) = Bx + e, \quad (2)$$

where the distortion term $e\in\mathbb{C}^M$ is uncorrelated with x, i.e., $\mathbb{E}[xe^H]=0_{M\times M}$. Furthermore, $B\in\mathbb{C}^{M\times M}$ is a diagonal matrix whose entries along the diagonal are given by $[B]_{m,m}=\mathbb{E}[\phi(\chi_m)\chi^*_m]/\mathbb{E}[|\chi_m|^2]$ for m=1, . . . , M. In this disclosure, for simplicity, we shall use a third-order polynomial model for the nonlinear PAs at the transmitter. Specifically, $$\phi(\chi) = \beta_1\chi + \beta_3\chi|\chi|^2, \quad (3)$$

where $\beta_1\in\mathbb{C}$ and $\beta_3\in\mathbb{C}$ are the model parameters, which we assume are known to the transmitter. A possible way of acquiring such knowledge is by performing over-the-air measurements using one or few observation receivers at the transmitter (see, e.g., [20], [21]). For the third-order polynomial model in (3) and for x=Ps, it holds that the gain matrix B in (2) depends on the precoding matrix P as $$B(P)=\beta_1 I_M + 2\beta_3 \text{diag}(PP^H). \quad (4)$$

B. An Achievable Sum Rate

By inserting (2) into (1), the received signal at the kth user can be written as $$y_k = h_k^T B(P)p_k s_k + \sum_{r \neq k} h_k^T B(P) p_r s_r + h_k^T e + w_k, \quad (5)$$

where $s_k$ is the desired symbol at the kth user. It should be noted that the effective noise term $\Sigma_{r \neq k} h_k^T B(P) p_r s_r + h_k^T e + w_k$ in (5) is, in general, non-Gaussian distributed due to the nonlinearity at the transmitter. Since Gaussian noise is the worst-case additive noise (in terms of mutual information) for Gaussian inputs under a covariance constraint [22], an achievable sum rate can be formulated as $$R_{sum}(P) = \sum_{k=1}^{K} \log_2(1 + SINDR_k(P)), \quad (6)$$

where $SINDR_k(P)$ is the signal-to-interference-noise and distortion ratio (SINDR) at the kth user, which is given by $$SINDR_k(P) = \frac{|h_k^T B(P) p_k|^2}{\sum_{r \neq k} |h_k^T B(P) p_r|^2 + h_k^T C_e(P) h_k^* + N_0}. \quad (7)$$

Here, $C_e(P) \in \mathbb{C}^{M \times M}$ is the covariance of the distortion e, which is given by (see, e.g., [17, Eq. (24)])

$$C_e(P) = 2|\beta_3|^2 (PP^H \odot P^* P^T \odot PP^H). \quad (8)$$

C. The Optimization Problem

Clearly, the choice of precoding matrix P has an impact on the sum rate in (6). Under the assumption of perfect channel state information (CSI) at the transmitter, our objective is to find the precoding matrix P that maximizes the sum rate in (6) under an equality constraint $\mathbb{E}[\|\phi(Ps)\|^2] = P_{tot}$ on the average transmit power. This optimization problem can be formulated as follows:

$$\underset{P \in \mathbb{C}^{M \times K}}{\text{maximize}} \; R_{sum}(P) \quad (9)$$

$$\text{subject to } \mathbb{E}[\|\phi(Ps)\|^2] = P_{tot}.$$

Note that (9) is a non-convex optimization problem since $R_{sum}(P)$ is a non-convex function of P. Next, we shall solve this problem approximately using the iterative algorithm described in Section III.

III. Distortion-Aware Linear Precoding

In what follows, we solve the constrained non-convex optimization problem (9) approximately using an iterative scheme based on gradient ascent followed by a projection step to ensure the feasibility of the solution. We shall refer to the output of the iterative scheme as the DAB precoding matrix. Specifically, our iterative solution updates the precoding matrix by taking steps along the steepest ascent direction of the objective function $R_{sum}(P)$ followed by normalization of the resulting precoding matrix as follows:

$$\tilde{P} = [P^{(i-1)} + \mu^{(i-1)} \nabla_P R_{sum}(P^{(i-1)})]^+_{\mathbb{E}\|\phi(Ps)\|^2 = P_{tot}}. \quad (10)$$

Here, i=1, ..., I is the iteration index, I is the maximum number of iterations, $\mu^{(i)}$ is the step size of the ith iteration, and $[\bullet]^+_{\mathbb{E}\|\phi(Ps)\|^2 = P_{tot}}$ denotes normalization of the updated precoding matrix such that the power constraint in (9) is satisfied. If $R_{sum}(\tilde{P}) > R_{sum}(P^{(i-1)})$, we update the precoding matrix to $P^{(i)} = \tilde{P}$ and reset the step size $\mu^{(i)} = \mu^{(0)}$. Otherwise, we do not update the precoding matrix, i.e., $P^{(i)} = P^{(i-1)}$, and decrease the step size $\mu^{(i)} = \frac{1}{2}\mu^{(i-1)}$. Finally, we choose $P_{DAB} = P^{(I)}$ as the DAB precoding matrix. In Algorithm 1, we summarize the steps required for computing the DAB precoding matrix using the projected gradient ascent approach.

Next, we shall provide a closed-form expression for the gradient $\nabla_P R_{sum}(P) \in \mathbb{C}^{M \times K}$, which is required to evaluate the update step (10). To this end, let $$n_k(P) = |h_k^T B(P) p_k|^2, \quad (11)$$

denote the numerator of the SINDR in (7). Furthermore, let $$d_k(P) = d_k^{mui}(P) + d_k^{dist}(P) + N_0, \quad (12)$$

denote the denominator of the SINDR in (7), where $d_k^{mui}(P) = \Sigma_{r \neq k} |h_k^T B(P) p_r|^2$ and $d_k^{dist}(P) = h_k^T C_e(P) h_k^*$ is the part of the denominator corresponding to multiuser interference and nonlinear

---

Algorithm 1 Algorithm for computing the distortion-aware beamforming (DAB) precoding matrix.

Inputs: $h_1, \ldots, h_K, \beta_1, \beta_3, P_{tot}$, and $N_0$
Output: $P_{DAB}$
Initialization: $\mu^{(0)}$ and $P^{(0)}$
1:    $R_{sum}^{(0)} \leftarrow R_{sum}(P^{(0)})$
2:    for i = 1, ..., I do
3:        $\tilde{P} \leftarrow [P^{(i-1)} + \mu^{(i-1)} \nabla_P R_{sum}(P^{(i-1)})]^+_{\mathbb{E}\|\phi(Ps)\|^2 = P_{tot}}$
4:        $\tilde{R}_{sum} \leftarrow R_{sum}(\tilde{P})$
5:        if $\tilde{R}_{sum} > R_{sum}^{(i-1)}$ then
6:          $P^{(i)} \leftarrow \tilde{P}, R_{sum}^{(i)} \leftarrow \tilde{R}_{sum}$, and $\mu^{(i)} \leftarrow \mu^{(0)}$.
7:        else
8:          $P^{(i)} \leftarrow P^{(i-1)}, R_{sum}^{(i)} \leftarrow R_{sum}^{(i-1)}$, and $\mu^{(i)} \leftarrow \frac{1}{2}\mu^{(i-1)}$
9:        end if
10:   end for
11:   $P_{DAB} \leftarrow P^{(I)}$

--- distortion, respectively. With these definitions, the gradient $\nabla_P R_{sum}(P)$ can be written as $$\nabla_P R_{sum}(P) = \sum_{k=1}^{K} \frac{2 \log_2(e)}{d_k^2(P)(1 + n_k(P)/d_k(P))} \times \left( d_k(P) \frac{\partial n_k(P)}{\partial P^*} - n_k(P) \frac{\partial d_k(P)}{\partial P^*} \right), \quad (13)$$

where $\partial n_k(P)/\partial P^* = [\partial n_k(P)/\partial p_1^*, \ldots, \partial n_k(P)/\partial p_K^*]$ and $\partial d_k(P)/\partial P^* = [\partial d_k(P)/\partial p_1^*, \ldots, \partial d_k(P)/\partial p_K^*]$. Hence, to compute the gradient $\nabla_P R_{sum}(P)$, we need to compute the derivatives of $n_k(P)$ and $d_k(P)$ for k=1, ..., K. Starting with the numerator, it can be shown that the derivative with respect to $p^*_{k'}$ can be written as $$\frac{\partial n_k(P)}{\partial p^*_{k'}} = (\Gamma_k(P)\mathbb{1}_{\{k'=k\}}(k') + \Upsilon_{k,k'}(P))p_{k'}, \quad (14)$$

for k'=1, ..., K. Here, we have defined $\Gamma_k(P) \in \mathbb{C}^{M \times M}$ as $$\Gamma_k(P) = |\beta_1|^2 h^*_k h^T_k + 2(\beta^*_1 \beta_3 h^*_k h^T_k \operatorname{diag}(\mathbf{PP}^H) + \quad (15)$$
$$\beta_1 \beta^*_3 \operatorname{diag}(\mathbf{PP}^H) h^*_k h^T_k) +$$
$$4|\beta_3|^2 \operatorname{diag}(\mathbf{PP}^H) h^*_k h^T_k \operatorname{diag}(\mathbf{PP}^H).$$

Furthermore, we have defined $\Upsilon_{k,k'}(P) \in \mathbb{C}^{M \times M}$ as $$\Upsilon_{k,k'}(P) = 2(\beta^*_1 \beta_3 \operatorname{diag}(p_{k'} p^H_{k'} h^*_k h^T_k) + \beta_1 \beta^*_3 \operatorname{diag}(h^*_k h^T_k p_{k'} p^H_{k'})) + \quad (16)$$
$$4|\beta_3|^2 (\operatorname{diag}(h^*_k h^T_k \operatorname{diag}(PP^H)) p_{k'} p^H_{k'} +$$
$$\operatorname{diag}(p_{k'} p^H_{k'} \operatorname{diag}(PP^H) h^*_k h^T_k)).$$

The derivative with respect to $p^*_{k'}$ of the denominator can be written as $$\frac{\partial d_k(P)}{\partial p^*_{k'}} = \frac{\partial d^{mui}_k(P)}{\partial p^*_{k'}} + \frac{\partial d^{dist}_k(P)}{\partial p^*_{k'}}, \quad (17)$$

where the derivative of the multiuser-interference term in the denominator is given by $$\frac{\partial d^{mui}_k(P)}{\partial p^*_{k'}} = \left(\Gamma_k(P)\mathbb{1}_{\{k' \neq k\}}(k') + \sum_{r \neq k} \Upsilon_{k,r}(P)\right) p_{k'}, \quad (18)$$

for k'=1, ..., K. Furthermore, the mth entry of the derivative of the nonlinear-distortion term in the denominator is given by $$\frac{\partial d^{dist}_k(P)}{\partial p^*_{m,k'}} = 2|\beta_3|^2 \quad (19)$$
$$\left(2h^*_{k,m} \sum_{m=1}^{M} h_{k,m'} p_{m',k'} [|PP^H|^2]_{m',m} + h_{k,m} \sum_{m'=1}^{M} h^*_{k,m'} p_{m',k'} [(PP^H)^2]_{m,m'}\right).$$

for k'=1, ..., K and m=1, ..., M, where $h_{k,m}=[h_k]_m$ and $p_{m,k}=[p_k]_m$. Finally, by inserting (11), (12), (14), (17), (18), and (19) into (13), we obtain a closed-form expression for the gradient $\nabla_P R_{sum}(P)$.

Note that the objective function (i.e, the sum rate) in Algorithm 1 is nondecreasing from one iteration to the next and that, for a given SNR, it is bounded from above. Hence, convergence of this algorithm is guaranteed. In order to increase the likelihood of converging to the global maximum instead of local maximum, we repeat the algorithm with multiple initializations and pick the solution that achieves the highest sum rate. By including the MRT and ZF precoding matrices among the set of initializations, we can guarantee that the DAB precoder does not perform any worse than these conventional linear precoders.

IV. Numerical Examples

We verify the efficacy of the proposed DAB precoding scheme by means of numerical simulation. First, we adopt a geometric channel model with a few scatterers for which we evaluate the achievable sum rate as well as the convergence behavior of Algorithm 1. Second, we study the far-field radiation pattern of the transmitted signal, which provides some insight into the working principle of the proposed precoding scheme.

In what follows, unless stated otherwise, we set M=16 antennas, $\beta_1$=0.98, $\beta_3$=−0.04−0.01j, and $P_{tot}$=43 dBm. We set the number of iterations to I=50 and run Algorithm 1 for 50 different initializations of $P^{(0)}$. Specifically, we initialize Algorithm 1 with the MRT and ZF precoding matrices along with 48 random initializations (where the elements of $P^{(0)}$ are drawn from a Gaussian distribution).

A. Geometric Channel Model

In order to capture the sparse scattering characteristics of mmWave channels in a non-line-of-sight (nLoS) environment, i.e., when there is no dominant path, we adopt a geometric channel model with L scatterers as in, e.g., [23], [24], for which $$h_k = \sqrt{\frac{N}{L}} \sum_{\ell=1}^{L} \alpha_{k,\ell} a(\psi_{k,\ell}), \quad (20)$$

for k=1, ..., K. Here, $\alpha_{k,\ell} \sim \mathcal{CN}(0, \gamma^2)$ is the channel gain (including path loss) corresponding to the $\ell$ th path, where $\gamma^2$ is the average path loss. Furthermore, $\psi_{k,\ell}$ is the angle of departure (AoD) for the $\ell$ th path and a($\psi_{k,\ell}$) is the corresponding array response vector. We assume that the transmit antennas are arranged in a uniform linear array (ULA) with $\lambda_c/2$ spacing (where $\lambda_c$ is the carrier wavelength) such that the mth entry of a($\psi_{k,\ell}$) is $$[a(\psi_{k,\ell})]_m = \frac{1}{\sqrt{N}} e^{-j\pi(m-1)\cos(\psi_{k,\ell})}, \quad (21)$$

for m=1, ..., M. Throughout our simulations, we shall use the following definition of signal-to-noise ratio (SNR):

$$SNR = \gamma^2 \frac{P_{tot}}{N_0}. \quad (22)$$

B. Performance Comparison

In FIG. 6, we compare, for the case K=2, the sum rate achieved by DAB precoding to the sum rate achieved by conventional MRT and ZF precoding, as a function of the SNR. We average the sum rate in (6) over $10^3$ random channel realizations, generated using the model in (20) under the assumption that the AoD $\psi_{k,\ell}$ is uniformly distributed over the interval [0°, 180°]. By adopting the nLoS path-loss model presented in [25, Table I] and by assuming that the system operates at carrier frequency $f_c$=28 GHz (such that $\lambda_c \approx 10.7$ mm) with the average distance from the transmitter to the users being 20 m, we find that the average path loss is $\gamma^2 = -110$ dB.

We note from FIG. 6 that DAB precoding outperforms the conventional linear precoders that do not take into account the distortion introduced by the nonlinear PAs. The improved performance is particularly evident in the high-SNR regime for which the performance is limited by the nonlinear distortion. In the low-SNR regime, i.e., when the thermal noise dominates over the nonlinear distortion (and over the multiuser interference) the performance of the DAB precoder coincides with the performance of the MRT precoder.

C. Far-Field Radiation Pattern

To understand why DAB precoding outperforms conventional linear precoders at high SNR, we illustrate in FIG. 5 the far-field radiation pattern of the transmitted signal for $K \in \{1,2\}$ users and $SNR \in \{-10,30\}$ dB. Recall from (2) that the transmitted signal can be written as the sum of a linear function of the input to the nonlinearity and a distortion term. The power of the linear component in the direction $\psi$ is $a^T(\psi)BPP^H B^H a^*(\psi)$; the power of the distortion term in the direction $\psi$ is $a^T(\psi)C_e a^*(\psi)$. In FIG. 5, for the case K=1, we set $h_1 = a(\psi_1)$, with $\psi_1 = 90°$. For the case, K=2, we set $h_1 = a(\psi_1)$ and $h_2 = a(\psi_2)$, with $\psi_1 = 30°$ and $\psi_2 = 90°$. For reference, we also show the far-field radiation pattern for MRT precoding, which is not dependent on the SNR operating point.

We observe from FIG. 5(a) and FIG. 5(b) that with MRT precoding, the distortion is beamformed towards the users. For high SNR values, DAB precoding, on the other hand, minimizes the distortion transmitted in the direction of the users in order to improve resulting SINDR. This becomes particularly evident in FIG. 5(e), where we observe that DAB precoding nulls the distortion in the direction of the user (recall that $\psi_1 = 90°$ for this scenario) at the cost of reduced array gain to the users and increased radiation in unwanted directions. This clarifies why DAB outperforms MRT and ZF in the high-SNR regime, where the performance is limited by the nonlinear distortion. For low SNR values, where the performance is limited by the thermal noise, the DAB precoder instead maximizes the array gain in the direction of the users to maximize the received power. Hence, the DAB precoder coincides with the MRT solution (compare, e.g., FIG. 5(a) and FIG. 5(b) with FIG. 5(c) and FIG. 5(d)).

V. Conclusions

In this disclosure, we have proposed an iterative scheme for computing a distortion-aware linear precoder. The proposed scheme is shown to yield significant gains compared to conventional linear precoders over a mmWave multiuser MISO downlink channel for the case when nonlinear PAs are used at the transmitter. We observed that, in the high-SNR regime and in the single-user case, the proposed algorithm is able to null the distortion in the direction of the user.

REFERENCES

[1] A. L. Swindlehurst, E. Ayanoglu, P. Heydari, and F. Capolino, "Millimeter-wave massive MIMO: The next wireless revolution?" *IEEE Commun. Mag.*, vol. 52, no. 9, pp. 56-62, September 2014.

[2] F. Boccardi, R. W. Heath Jr., A. Lozano, T. L. Marzetta, and P. Popovski, "Five disruptive technology directions for 5G," *IEEE Commun. Mag.*, vol. 52, no. 2, pp. 74-80, February 2014.

[3] S. A. Busari, K. M. S. Huq, S. Mumtaz, L. Dai, and J. Rodriguez, "Millimeter-wave massive MIMO communication for future wireless systems: A survey," *IEEE Commun. Surveys Tuts.*, vol. 20, no. 2, pp. 836-869, Second quarter 2018.

[4] J. Qi and S. Aissa, "On the power amplifier nonlinearity in MIMO transmit beamforming systems," *IEEE Trans. Commun.*, vol. 60, no. 3, pp. 876-887, March 2012.

[5] S. Blandino, C. Desset, A. Bourdoux, L. Van der Perre, and S. Pollin, "Analysis of out-of-band interference from saturated power amplifiers in massive MIMO," in *Proc. Eur. Conf. Netw. Commun. (EuCNC)*, Oulu, Finland, July 2017.

[6] C. Mollen, U. Gustavsson, T. Eriksson, and E. G. Larsson, "Spatial characteristics of distortion radiated from antenna arrays with transceiver nonlinearities," *IEEE Trans. Wireless Commun.*, vol. 17, no. 10, pp. 6663-6679, October 2018.

[7] N. N. Moghadam, G. Fodor, M. Bengtsson, and D. J. Love, "On the energy efficiency of MIMO hybrid beamforming for millimeter-wave systems with nonlinear power amplifiers," *IEEE Trans. Wireless Commun.*, vol. 17, no. 11, pp. 7208-7221, November 2018.

[8] A. Mezghani and J. A. Nossek, "Capacity lower bound of MIMO channels with output quantization and correlated noise," in *IEEE Int. Symp. Inf. Theory (ISIT)*, Cambridge, MA, USA, July 2012.

[9] M. R. Khanzadi, G. Durisi, and T. Eriksson, "Capacity of SIMO and MISO phase-noise channels with common/separate oscillators," *IEEE Trans. Commun.*, vol. 63, no. 9, pp. 3218-3231, September 2015.

[10] N. Kolomvakis, M. Matthaiou, and M. Coldrey, "IQ imbalance in multiuser systems: Channel estimation and compensation," *IEEE Trans. Commun.*, vol. 64, no. 7, pp. 3039-3051, July 2016.

[11] S. Jacobsson, G. Durisi, M. Coldrey, T. Goldstein, and C. Studer, "Quantized precoding for massive MU-MIMO," *IEEE Trans. Commun.*, vol. 65, no. 11, pp. 4670-4684, November 2017.

[12] O. De Candido, H. Jedda, A. Mezghani, A. L. Swindlehurst, and J. A. Nossek, "Reconsidering linear transmit signal processing in 1-bit quantized multi-user MISO systems," *IEEE Trans. Wireless Commun.*, vol. 18, no. 1, pp. 254-267, January 2019.

[13] C. Studer, M. Wenk, and A. Burg, "MIMO transmission with residual transmit-RF impairments," in *Proc. Int. ITG Workshop on Smart Antennas (WSA)*, Bremen, Germany, February 2010, pp. 189-196.

[14] X. Zhang, M. Matthaiou, M. Coldrey, and E. Björnson, "Impact of residual transmit RF impairments on training-based MIMO systems," *IEEE Trans. Commun.*, vol. 63, no. 8, pp. 2899-2911, August 2015.

[15] E. Björnson, J. Hoydis, M. Kountouris, and M. Debbah, "Massive MIMO systems with non-ideal hardware: Energy efficiency, estimation, and capacity limits," *IEEE Trans. Inf. Theory*, vol. 11, no. 60, pp. 7112-7139, November 2014.

[16] E. G. Larsson and L. Van der Perre, "Out-of-band radiation from antenna arrays clarified," *IEEE Wireless Commun. Lett.*, vol. 7, no. 4, pp. 610-613, February 2018.

[17] E. Björnson, L. Sanguinetti, and J. Hoydis, "Hardware distortion correlation has negligible impact on UL massive MIMO spectral efficiency," *IEEE Trans. Commun.*, to appear.

[18] S. Jacobsson, U. Gustavsson, G. Durisi, and C. Studer, "Massive MU-MIMO-OFDM uplink with hardware impairments: Modeling and analysis," in *Proc. Asilomar Conf. Signals, Syst., Comput.*, Pacific Grove, CA, USA, October 2018, pp. 1829-1835.

[19] J. J. Bussgang, "Crosscorrelation functions of amplitude-distorted Gaussian signals," Res. Lab. Elec., Cambridge, MA, USA, Tech. Rep. 216, March 1952.

[20] K. Hausmair, U. Gustavsson, C. Fager, and T. Eriksson, "Modeling and linearization of multi-antenna transmitters using over-the-air measurements," in *Proc. IEEE Int. Symp. Circuits and Syst.* (*ISCAS*), Florence, Italy, May 2018.

[21] S. Hesami, S. Rezaei Aghdam, C. Fager, T. Eriksson, R. Farrell, and J. Dooley, "Intra-array coupling estimation for MIMO transceivers utilizing blind over-the-air measurements," in *Proc. IEEE MTTS Int. Microw. Symp.* (*IMS*), Boston, MA, USA, 2019, to appear.

[22] S. N. Diggavi and T. M. Cover, "The worst additive noise under a covariance constraint," *IEEE Trans. Inf. Theory*, vol. 47, no. 7, pp. 3072-3081, November 2001.

[23] A. Alkhateeb, O. El Ayach, G. Leus, and R. W. Heath Jr., "Channel estimation and hybrid precoding for millimeter wave cellular systems," *IEEE J. Sel. Topics Signal Process.*, vol. 8, no. 5, pp. 831-846, October 2014.

[24] A. Alkhateeb, G. Leus, and R. W. Heath Jr., "Limited feedback hybrid precoding for multi-user millimeter wave systems," *IEEE Trans. Wireless Commun.*, vol. 14, no. 11, pp. 6481-6494, November 2015.

[25] M. R. Akdeniz, Y. Liu, M. K. Samimi, S. Sun, S. Rangan, T. S. Rappaport, and E. Erkip, "Millimeter wave channel modeling and cellular capacity evaluation," *IEEE J. Sel. Areas Commun.*, vol. 32, no. 6, pp. 1164-1179, June 2014.

The invention claimed is:

1. A method for beamformed transmission using a precoder, the method being performed by a radio transceiver device, the radio transceiver device comprising hardware, the hardware impacting transmission of signals from the radio transceiver device, the method comprising:
   acquiring channel conditions of a radio propagation channel between the radio transceiver device and at least one other radio transceiver device;
   determining a precoder, in form of a linear precoding matrix, for beamformed transmission towards the at least one other radio transceiver device, the precoder being determined according to the channel conditions and a model of how the hardware impacts the transmission of signals from the radio transceiver device; and
   transmitting, using the precoder, a signal towards the at least one other radio transceiver device,
   wherein the hardware comprises digital to analog converters, and wherein the model represents how bit resolutions of the digital to analog converters impact the transmission.

2. The method according to claim 1, wherein the hardware comprises power amplifiers, and wherein the model represents how input-output characteristics of the power amplifiers impact the transmission.

3. The method according to claim 2, wherein the power amplifiers are operated in their non-linear region when transmitting the signal towards the at least one other radio transceiver device.

4. The method according to claim 1, wherein the hardware comprises oscillators, and wherein the model represents how phase noise of the oscillators impact the transmission.

5. The method according to claim 1, wherein, according to the model, the hardware has a memoryless and/or non-linear impact on the transmission.

6. The method according to claim 1, wherein the precoder is determined by solving a non-convex optimization problem.

7. The method according to claim 6, wherein the optimization problem as input parameters has the channel conditions, the model, a transmit power constraint, and a default precoder not impacted by the hardware.

8. The method according to claim 6, wherein solving the optimization problem involves maximizing an achievable sum-rate for the precoder, subject to the transmit power constraint as given when applying the precoder to a signal vector representing the signal to be transmitted.

9. The method according to claim 6, wherein solving the problem involves determining a signal-to-interference-noise-and-distortion ratio.

10. The method according to claim 1, wherein the precoder is determined by solving a sum-rate optimization problem, a max-min per-user rate problem, or a mean-squared error problem.

11. The method according to claim 1, wherein the channel conditions are defined by channel state information and comprise information of interference in the radio propagation channel.

12. The method according to claim 1, wherein the model is preconfigured in the radio transceiver device.

13. The method according to claim 1, wherein the model is obtained through estimation.

14. The method according to claim 1, wherein the radio transceiver device comprises transmit antenna elements from which the signal is transmitted, and wherein less than all of the transmit antenna elements are utilized when transmitting the signal towards the at least one other radio transceiver device.

15. The method according to claim 1, wherein the radio transceiver device is part of a radio access network node or a terminal device.

16. A radio transceiver device for beamformed transmission using a precoder, the radio transceiver device comprising hardware, the hardware impacting transmission of signals from the radio transceiver device, the radio transceiver device further comprising processing circuitry, the processing circuitry being configured to cause the radio transceiver device to:
   acquire channel conditions of a radio propagation channel between the radio transceiver device and at least one other radio transceiver device;
   determine a precoder, in form of a linear precoding matrix, for beamformed transmission towards the at least one other radio transceiver device, the precoder being determined according to the channel conditions and a model of how the hardware impacts the transmission of signals from the radio transceiver device; and
   transmit, using the precoder, a signal towards the at least one other radio transceiver device, wherein the hardware comprises digital to analog converters, and wherein the model represents how bit resolutions of the digital to analog converters impact the transmission.

17. A radio transceiver device for beamformed transmission using a precoder, the radio transceiver device comprising hardware, the hardware impacting transmission of signals from the radio transceiver device, the radio transceiver device further comprising:
   an acquire module configured to acquire channel conditions of a radio propagation channel between the radio transceiver device and at least one other radio transceiver device;
   a determine module configured to determine a precoder, in form of a linear precoding matrix, for beamformed transmission towards the at least one other radio transceiver device, the precoder being determined according to the channel conditions and a model of how the hardware impacts the transmission of signals from the radio transceiver device; and
   a transmit module configured to transmit, using the precoder, a signal towards the at least one other radio transceiver device,
   wherein the hardware comprises digital to analog converters, and wherein the model represents how bit resolutions of the digital to analog converters impact the transmission.

18. A computer program product for beamformed transmission using a precoder, the computer program product comprising a non-transitory computer readable medium storing computer code comprising instructions which, when run on processing circuitry of a radio transceiver device, the radio transceiver device comprising hardware, the hardware impacting transmission of signals from the radio transceiver device, causes the radio transceiver device to:
   acquire channel conditions of a radio propagation channel between the radio transceiver device and at least one other radio transceiver device;
   determine a precoder, in form of a linear precoding matrix, for beamformed transmission towards the at least one other radio transceiver device, the precoder being determined according to the channel conditions and a model of how the hardware impacts the transmission of signals from the radio transceiver device; and
   transmit, using the precoder, a signal towards the at least one other radio transceiver device,
   wherein the hardware comprises digital to analog converters, and wherein the model represents how bit resolutions of the digital to analog converters impact the transmission.

* * * * *